(12) United States Patent
Xie et al.

(10) Patent No.: US 12,215,592 B1
(45) Date of Patent: Feb. 4, 2025

(54) PREFORM FOR MAKING A CASING STRUCTURE FOR TURBINE ENGINES

(71) Applicant: General Electric Company, Schenectady, NY (US)

(72) Inventors: Ming Xie, Dayton, OH (US); Mingchao Wang, West Chester, OH (US); Douglas Lorrimer Armstrong, Needham, MA (US); Mitchell Boyer, Cincinnati, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/435,191

(22) Filed: Feb. 7, 2024

(51) Int. Cl.
*F01D 25/24* (2006.01)
*F01D 25/00* (2006.01)

(52) U.S. Cl.
CPC ......... *F01D 25/243* (2013.01); *F01D 25/005* (2013.01); *F05D 2240/14* (2013.01); *F05D 2300/603* (2013.01)

(58) Field of Classification Search
CPC .. F01D 25/243; F01D 25/005; F05D 2240/14; F05D 2300/603
See application file for complete search history.

(56) References Cited

U.S. PATENT DOCUMENTS

| | | | |
|---|---|---|---|
| 8,127,802 B2 | 3/2012 | Ouellette et al. | |
| 8,499,450 B2 | 8/2013 | Naik | |
| 8,696,319 B2 | 4/2014 | Naik | |
| 8,864,075 B2 | 10/2014 | Gray | |
| 9,149,997 B2* | 10/2015 | Foster | F01D 21/045 |
| 9,903,228 B2* | 2/2018 | Durie | F01D 21/045 |
| 10,100,664 B2 | 10/2018 | Renggli et al. | |
| 10,519,576 B2 | 12/2019 | Marchal et al. | |
| 10,724,159 B2 | 7/2020 | Marchal et al. | |
| 2008/0116334 A1* | 5/2008 | Xie | B29D 99/0014 248/205.1 |
| 2012/0270006 A1* | 10/2012 | McMillan | F01D 25/243 428/77 |
| 2018/0355760 A1* | 12/2018 | Kerns | F01D 25/28 |
| 2018/0363903 A1* | 12/2018 | Dziech | F23R 3/007 |
| 2019/0003710 A1* | 1/2019 | Corsmeier | F23R 3/283 |

* cited by examiner

*Primary Examiner* — Hoang M Nguyen
(74) *Attorney, Agent, or Firm* — Venable LLP; Michele V. Frank

(57) ABSTRACT

A preform for making a casing structure for turbine engines. The preform includes a plurality of reinforcing fiber tows arranged in a two-dimensional weave structure, a three-dimensional weave structure, or a braided structure. The plurality of reinforcing fiber tows include integrally woven or braided fiber tows having a diameter or a density greater than a respective diameter or density of other woven or braided fiber tows in the two-dimensional weave structure, the three-dimensional weave structure, or the braided structure. The integrally woven or braided fiber tows are located in an area of the preform that is bent to form an angled corner to thereby provide strength to a casing structure comprising the angled corner.

20 Claims, 6 Drawing Sheets

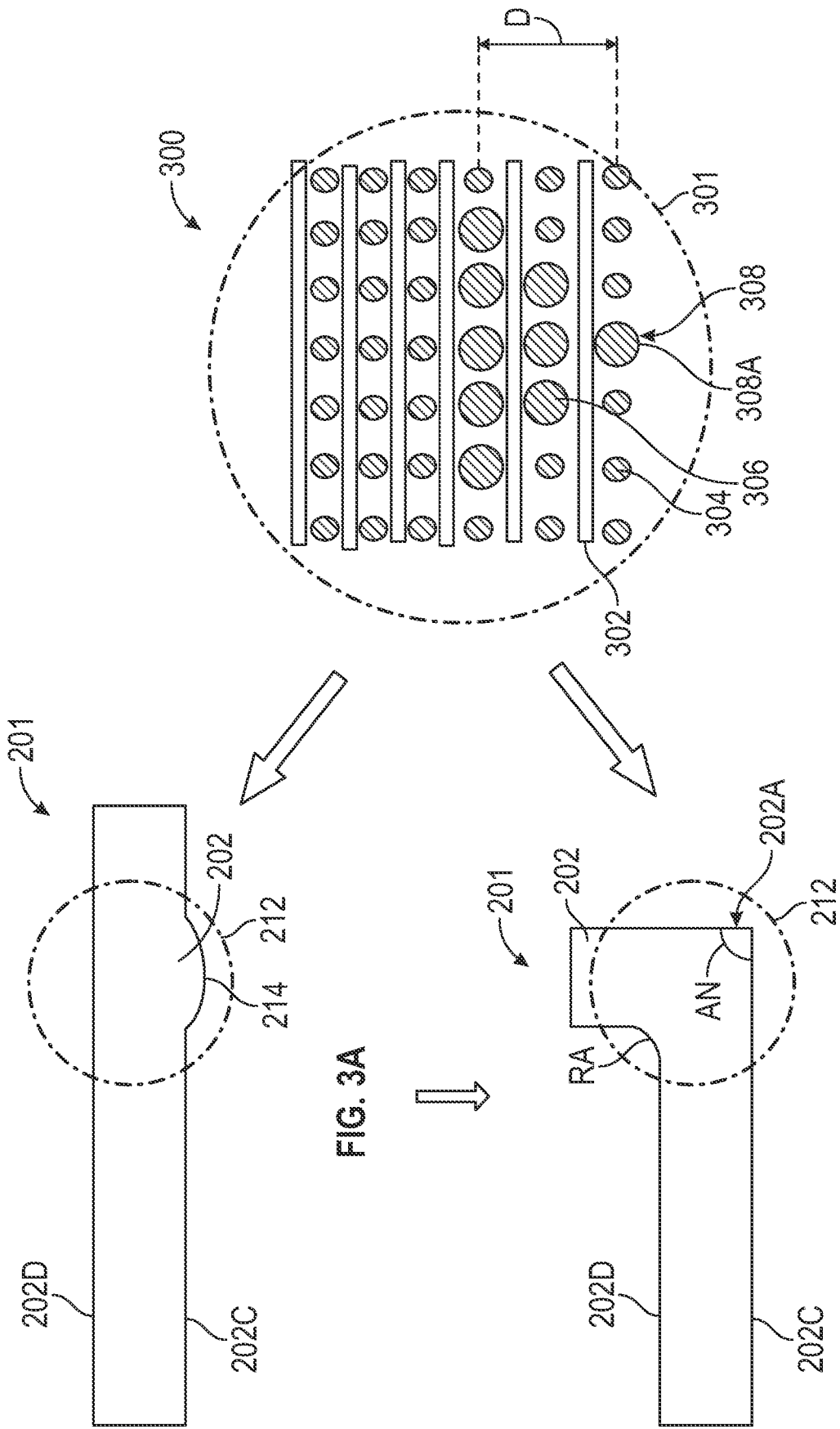

PREFORM FOR MAKING A CASING STRUCTURE FOR TURBINE ENGINES

GOVERNMENT LICENSE RIGHTS

This invention was made with United States Government support. The United States Government may have certain rights in the invention.

TECHNICAL FIELD

The present disclosure relates generally to casing structures in turbine engines and, in particular, to a preform for making a casing structure for turbine engines.

BACKGROUND

Turbine engines, such as a gas turbine engine, generally include a fan and a turbo-engine. Casing structures are used to house various parts of the turbine engine such as the fan casing to house the fan. Each casing structure may be provided with a flange to couple to another casing structure. The flange may be integral with the casing structure. The flange on a casing structure typically has an angled corner (e.g., a square corner).

BRIEF DESCRIPTION OF THE DRAWINGS

Features and advantages will be apparent from the following, more particular, description of various exemplary embodiments, as illustrated in the accompanying drawings, wherein like reference numbers generally indicate identical, functionally similar, and/or structurally similar elements.

FIG. 3A is a schematic representation of a portion of a first casing structure prior to forming a first flange, according to an embodiment of the present disclosure.

FIG. 3B is a schematic cross section of a region of a three-dimensional weave preform used in a first angled corner of the first flange of the first casing structure, according to an embodiment of the present disclosure.

FIG. 3C is a schematic representation of the portion of the first casing structure after forming the first flange, according to an embodiment of the present disclosure.

DETAILED DESCRIPTION

Figure 1:
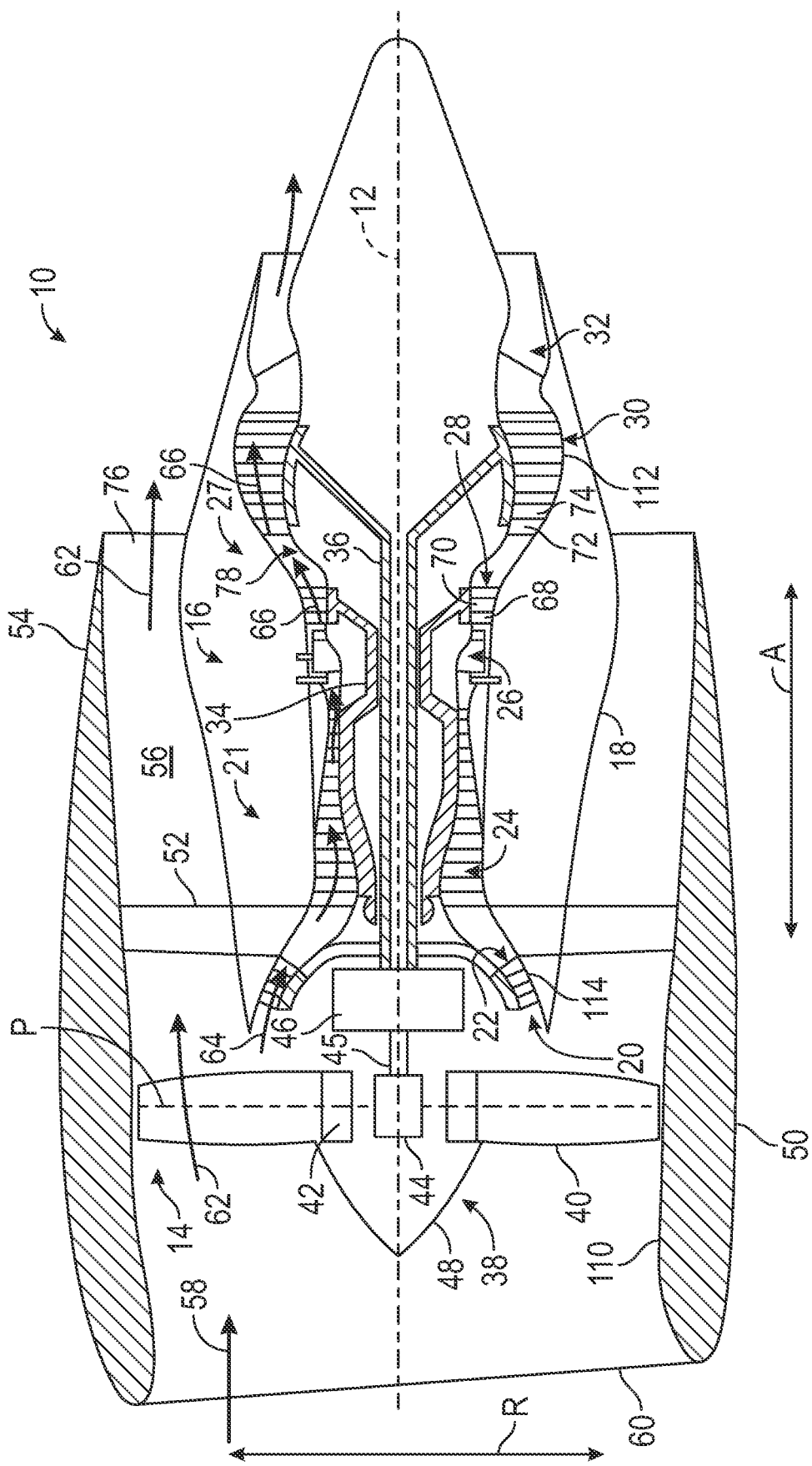
FIG. 1 is a schematic cross-sectional diagram of a turbine engine, according to an aspect of the present disclosure.

Features, advantages, and embodiments of the present disclosure are set forth or apparent from a consideration of the following detailed description, drawings, and claims. Moreover, the following detailed description is exemplary and intended to provide further explanation without limiting the disclosure as claimed.

Various embodiments of the present disclosure are discussed in detail below. While specific embodiments are discussed, this is done for illustration purposes only. A person skilled in the relevant art will recognize that other components and configurations may be used without departing from the present disclosure.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a," "an," and "the" include plural references unless the context clearly dictates otherwise.

As used herein, the terms "axial" and "axially" refer to directions and orientations that extend substantially parallel to a centerline axis of the turbine engine. Moreover, the terms "radial" and "radially" refer to directions and orientations that extend substantially perpendicular to the centerline axis of the turbine engine. In addition, as used herein, the terms "circumferential" and "circumferentially" refer to directions and orientations that extend arcuately about the centerline axis of the turbine engine.

As used herein, the terms "first," "second," "third," and the like, may be used interchangeably to distinguish one component from another and are not intended to signify location or importance of the individual components.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially" is not to be limited to the precise value specified. In at least some instances, the approximating language may correspond to the precision of an instrument for measuring the value, or the precision of the methods or the machines for constructing or manufacturing the components and/or systems. For example, the approximating language may refer to being within a one, two, four, ten, fifteen, or twenty percent margin in either individual values, range(s) of values, and/or endpoints defining range(s) of values.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

The term "composite," as used herein, is indicative of a material having two or more constituent materials. A composite can be a combination of at least two or more metallic, non-metallic, or a combination of metallic and non-metallic elements or materials. Examples of a composite material can be, but not limited to, a polymer matrix composite (PMC), a ceramic matrix composite (CMC), a metal matrix composite (MMC). The composite may be formed of a matrix material and a reinforcing element, such as a fiber (referred to herein as a reinforcing fiber).

As used herein "reinforcing fibers" or "reinforcing fiber tows" may include, for example, glass fibers, carbon fibers, steel fibers, or para-aramid fibers, such as Kevlar® available from DuPont of Wilmington, Delaware. The reinforcing fibers may be in the form of fiber tows that include a plurality of fibers that are formed into a bundle. The fiber tows may include hundreds or thousands of fibers, for example, 3000 (3k), 12000 (12k), 24000 (24k), etc. The polymeric matrix material may include, for example thermoset resin, thermoplastic resin, bismaleimide (BMI) materials, polyimide materials.

"Preform" as used herein is a piece of three-dimensional woven fabric formed by a plurality of reinforcing fiber tows including warp fiber tows and weft fiber tows.

As may be used herein, a "composite component" refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. Adhesives can include resin and phenolics, wherein the adhesive can require curing at elevated temperatures or other hardening techniques.

As may be used herein, PMC refers to a class of materials. The PMC material may be a prepreg. A prepreg is a reinforcement material (e.g., a reinforcing fiber) pre-impregnated with a polymer matrix material, such as thermoplastic resin. The reinforcing fiber tows are embedded within the polymer matrix material (e.g., the thermoplastic resin). Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of a non-limiting example, electrostatically, and then adhered to the fiber, by way of a non-limiting example, in an oven or with the assistance of heated rollers.

Resins for matrix materials of PMCs can be generally classified as thermoset resin polymers or thermoplastic resin polymers. Thermoplastic resin polymers are generally categorized as polymers that can be repeatedly softened and flowed when heated, and hardened when sufficiently cooled due to physical rather than chemical changes. Notable example classes of thermoplastic resin polymers include nylons, thermoplastic polyesters, polyaryletherketones, and polycarbonate resins. A specific example of high-performance thermoplastic resins that have been contemplated for use in aerospace applications include polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead, thermally decompose when sufficiently heated. Notable examples of thermoset resin polymers include epoxy, bismaleimide (BMI), and polyimide resins.

Instead of using a prepreg with thermoplastic polymers, another non-limiting example utilizes a woven fabric. A woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers to a mold or a cavity. The dry fibers can include prepreg, braided material, woven material, or any combination thereof. Resin can be pumped into or otherwise provided to the mold or the cavity to impregnate the dry fibers. The combination of the impregnated fibers and the resin is then cured and removed from the mold. When removed from the mold, the composite component can require post-curing processing. RTM may be a vacuum assisted process. That is, the air from the cavity or the mold can be removed and replaced by the resin prior to heating or curing. The placement of the dry fibers can be manual or automated. The dry fibers can be contoured to shape the composite component or to direct the resin. Optionally, additional layers or reinforcing layers of a material differing from the dry fiber can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide, SiC/SiC for silicon carbide-fiber-reinforced silicon carbide, SiC/SiN for silicon carbide fiber-reinforced silicon nitride, SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain non-limiting examples, the reinforcing fibers may be bundled (e.g., form reinforced fiber tows) and/or coated prior to inclusion within the matrix. The bundles of reinforced fibers (i.e., reinforced fiber tows) may be impregnated with a slurry composition prior to forming the preform or after formation of the preform. The preform may then undergo thermal processing, and subsequent chemical processing to arrive at a component formed of a CMC material having a desired chemical composition. For example, the preform may undergo a cure or a burn-out to yield a high char residue in the preform, and subsequent melt-infiltration with silicon, or a cure or a pyrolysis to yield a silicon carbide matrix in the preform, and subsequent chemical vapor infiltration with silicon carbide. Additional steps may be taken to improve densification of the preform, either before or after chemical vapor infiltration, by injecting the preform with a liquid resin or a polymer followed by a thermal processing step to fill the voids with the silicon carbide. A CMC material as used herein may be formed using any known or hereafter developed methods including, but not limited to, melt infiltration, chemical vapor infiltration, polymer impregnation pyrolysis (PIP), or any combination thereof.

The term "metallic" as used herein is indicative of a material that includes metal such as, but not limited to, titanium, iron, aluminum, stainless steel, and nickel alloys. A metallic material or alloy can be a combination of at least two or more elements or materials, where at least one is a metal.

Traditional two-dimensional (2D) layup designs typically used for forming composite gas turbine engine components are challenging to manufacture and may have limited interlaminar strength. Specifically, composite components for gas turbine engines are generally constructed with hand laid plies or by combining multiple woven or prefabricated preforms into one molded part. Hand layup or assembly of preforms increases the labor and costs required to build the component. Assembly of preforms also comes with assembly and positioning challenges. Moreover, a composite component formed from 2D plies or multiple preforms will be more likely to have limited interlaminar loading capability.

Casing structures are used to house various parts of the turbine engine such as the fan casing to house the fan, the low pressure (LP) turbine casing to house the LP turbine, the LP compressor casing to house the LP compressor, etc. Each casing structure may be provided with a flange to couple to another casing structure. The flange may be integral with the casing structure. The flange on a casing structure typically has an angled corner (e.g., a square corner). For example, a first square corner of a first flange of a first casing structure couples to a second square corner of a second flange of a second casing structure. The first square corner and the second square corner are aligned such that a first surface of first square corner and a second surface of the second square corner are substantially aligned to form a continuous airflow surface. The first square corner and the second square corner can also improve a compressive strength joint between the first flange and the second flange. Conventionally, integral flange corners, also referred to as heels, are constructed and formed by manually adding additional build-up and machining plies. However, these flange corners provided with additional build-up suffer from mechanical weakness and thus may be prone to cracking and failure, which may cause the flange to lose structural integrity.

The present preform for making a casing structure and method for making the casing structure integrate additional and/or relatively larger fiber tows in the flange area of the casing structure during the process of preforming the flange corners in the casing structure. The present preform for making the casing structure and method can be used for integral flanges constructed out of a variety of preforms such as three-dimensional (3D) weave, a two-dimensional (2D) weave, or a braid. Furthermore, the present preform for making the casing structure and method can be used in a variety of casing structures, such as a fan containment case and/or a front frame outer shell.

Integrally weaving additional and/or larger fiber tows in the flange area to construct the flange corner, also referred to as a heel, instead of manually laying in additional build-up and/or machining plies, provides strength to the flange corner, and the flange as whole. In addition, a top surface of a fiber preform in the flange corner area can be provided with a reduced count of fiber tows and/or fiber tows (i.e., a bundle of fibers) having a smaller diameter so as to form a smaller and/or smoother inner radius. In addition, using a three-dimensional (3D) weaving process or a two-dimensional (2D) weaving or braiding process enables automated integration of additional and/or larger fiber tows at an outer radius of the flange corner.

The present flange structure and method are applicable to a typical integral ninety-degree upturned flange, or any structural member that is constructed with a straight preform bent to a desired angle (e.g., an angle from thirty degrees to one hundred fifty degrees). The present flange structure and method improve the square corner manufacturing process. The square corner manufacturing process also provides a more robust flange structure and better load carrying capability for using a bolted joint as compared to a flange structure without the benefit of the present disclosure.

Referring now to the drawings, FIG. 1 is a schematic cross-sectional diagram of a turbine engine 10, according to an embodiment of the present disclosure. As shown in FIG. 1, the turbine engine 10 defines an axial direction A (extending parallel to a longitudinal centerline axis 12 provided for reference) and a radial direction R that is normal to the axial direction A. In general, the turbine engine 10 includes a fan section 14 and a turbo-engine 16 disposed downstream from the fan section 14.

The turbo-engine 16 depicted generally includes an outer casing 18 that is substantially tubular and defines an annular core inlet 20. As schematically shown in FIG. 1, the outer casing 18 encases, in serial flow relationship, a compressor section 21 including a booster or a low pressure (LP) compressor 22 followed downstream by a high pressure (HP) compressor 24, a combustion section 26, a turbine section 27 including a high pressure (HP) turbine 28 followed downstream by a low pressure (LP) turbine 30, and a jet exhaust nozzle section 32. A high pressure (HP) shaft or a spool 34 drivingly connects the HP turbine 28 to the HP compressor 24 to rotate the HP turbine 28 and the HP compressor in unison. A low pressure (LP) shaft 36 drivingly connects the LP turbine 30 to the LP compressor 22 to rotate the LP turbine 30 and the LP compressor 22 in unison. The compressor section 21, the combustion section 26, the turbine section 27, and the jet exhaust nozzle section 32 together define a core air flowpath.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuation member 44 configured to collectively vary the pitch of the fan blades 40 in unison. The fan blades 40, the disk 42, and the actuation member 44 are together rotatable about the longitudinal centerline axis 12 via a fan shaft 45 that is powered by the LP shaft 36 across a power gearbox 46. The power gearbox 46 includes a plurality of gears for adjusting the rotational speed of the fan shaft 45 and, thus, the fan 38 relative to the LP shaft 36 to a more efficient rotational fan speed.

Referring still to the exemplary embodiment of FIG. 1, the disk 42 is covered by a rotatable fan hub 48 aerodynamically contoured to promote an airflow through the plurality of fan blades 40. In addition, the fan section 14 includes an annular fan casing or a nacelle 50 that circumferentially surrounds the fan 38 and/or at least a portion of the turbo-engine 16. The nacelle 50 is supported relative to the turbo-engine 16 by a plurality of circumferentially spaced outlet guide vanes 52. Moreover, a downstream section 54 of the nacelle 50 extends over an outer portion of the turbo-engine 16 to define a bypass airflow passage 56 therebetween.

During operation of the turbine engine 10, a volume of air 58 enters the turbine engine 10 through an inlet 60 of the nacelle 50 and/or the fan section 14. As the volume of air 58 passes across the fan blades 40, a first portion of the air 62 is directed or routed into the bypass airflow passage 56, and a second portion of the air 64 is directed or is routed into the upstream section of the core air flowpath, or, more specifically, into the annular inlet 20 of the LP compressor 22. The ratio between the first portion of air 62 and the second portion of air 64 is commonly known as a bypass ratio. The pressure of the second portion of air 64 is then increased as it is routed through the HP compressor 24 and into the combustion section 26, where the highly pressurized air is mixed with fuel and burned to generate combustion gases 66.

The combustion gases 66 are routed into the HP turbine 28 and expanded through the HP turbine 28 where a portion of thermal and/or of kinetic energy from the combustion gases 66 is extracted via sequential stages of HP turbine stator vanes 68 that are coupled to the outer casing 18 and HP turbine rotor blades 70 that are coupled to the HP shaft or spool 34, thus, causing the HP shaft or the spool 34 to rotate, thereby supporting operation of the HP compressor 24. The combustion gases 66 are then routed into the LP turbine 30 and expanded through the LP turbine 30. Here, a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus, causing the LP shaft 36 to rotate. This, thereby, supports operation of the LP compressor 22 and rotation of the fan 38 via the power gearbox 46.

The combustion gases 66 are subsequently routed through the jet exhaust nozzle section 32 of the turbo-engine 16 to provide propulsive thrust. Simultaneously, the pressure of the first portion of air 62 is substantially increased as the first portion of air 62 is routed through the bypass airflow passage 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the turbo-engine 16.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable gas turbine engine, such as, for example, turbofan engines, propfan engines, turbojet engines, and/or turboshaft engines.

Casing structures are used to house various parts of the turbine engine such as a fan casing 110 to house the fan blades 40, a LP turbine casing 112 to house the LP turbine 30, a LP compressor casing 114 to house the LP compressor 22, etc. Each casing structure may be provided with a flange to couple to another flange of another casing structure.

Figure 2:
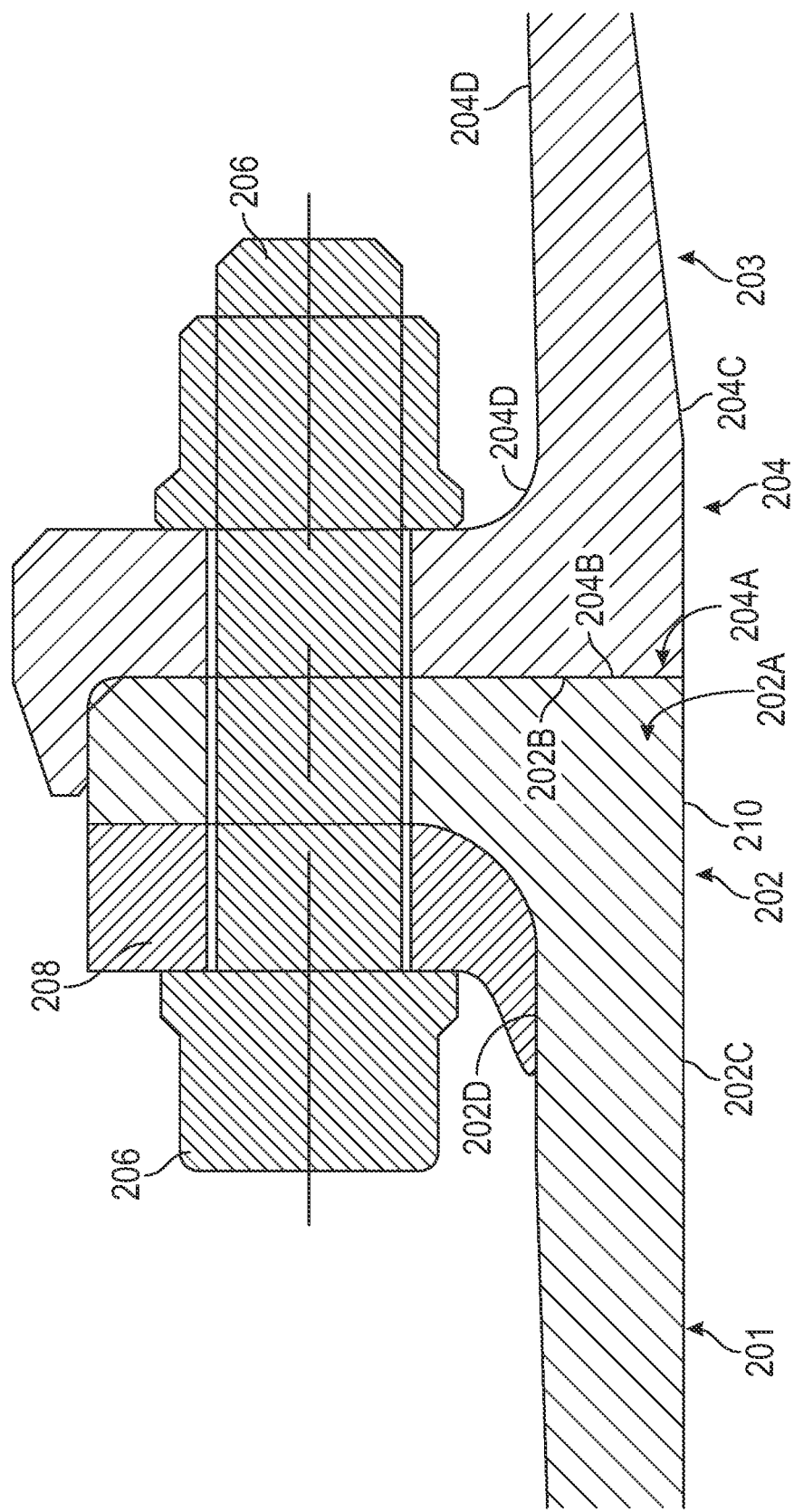
FIG. 2 is a cross-sectional view of two flanges of casing structures coupled to each other, according to an embodiment of the present disclosure.

FIG. 2 is a cross-sectional view of two flanges coupled to each other, according to an embodiment of the present disclosure. As shown in FIG. 2, a first flange 202 is integral with a first casing structure 201. A second flange 204 is integral with a second casing structure 203. FIG. 2 shows only a portion of the first casing structure 201 and a portion of the second casing structure 203. The first flange 202 of the first casing structure 201 typically has a first angled corner 202A (e.g., a first square corner). The second flange 204 of the second casing structure 203 typically has a second angled corner 204A (e.g., a first square corner). The first flange 202 and the second flange 204 are coupled to each other at the first angled corner 202A and the second angled corner 204A using a fastener 206 (e.g., a bolt and a nut). The fastener 206 is used to bring the first flange 202 and the second flange 204 into close contact with each other such that a first contact surface 202B of the first angled corner 202A of the first flange 202 contacts a second contact surface 204B of the second angled corner 204A of the second flange 204. As shown in FIG. 2, a load spreader 208 may be provided between the fastener 206 and the first angled corner 202A. The load spreader 208 is used to spread a load exerted by the fastener 206 on the first angled corner 202A. For example, if the fastener 206 is a bolt and nut combination, the load spreader 208 (e.g., a washer-like element) can be used to spread the load exerted by a head of the bolt. Alternatively, or additionally, another load spreader (not shown) can also be provided between the fastener 206 and the second angled corner 204A. The load spreader 208 can be made, for example, of a metal.

The first angled corner 202A and the second angled corner 204A are aligned such that a first inner radius surface 202C of the first angled corner 202A and a second inner radius surface 204C of the second angled corner 204A are substantially aligned to form a continuous airflow surface 210. The term "substantially aligned" is used herein to mean that the first inner radius surface 202C and the second inner radius surface 204C form a plane at a certain level and an angle between the first inner radius surface 202C and the second inner radius surface 204C is approximately zero degree, plus or minus two degrees. The contact between the first angled corner 202A and the second angled corner 204A can also improve a compressive strength joint between the first flange 202 and the second flange 204.

As shown in FIG. 2, the first angled corner 202A has also a first outer radius surface 202D that forms an angle (for example, about ninety degrees). Similarly, the second angled corner 204A has a second outer radius surface 204D that forms an angle (for example, about ninety degrees). The fastener 206 and/or the load spreader 208 come in contact with the first outer radius surface 202D. In an embodiment, the fastener 206 may also come in contact with the second outer radius surface 204D. The terms "inner radius surface"

and "outer radius surface" refer, respectively, to a surface that is radially nearest to the longitudinal centerline axis 12 and to a surface that is radially further from the longitudinal centerline axis.

Conventionally, angled corners of flanges (also referred to as heels) are constructed and formed by manually adding additional build-up and machining plies. However, these angled corners of flanges provided with additional build-up suffer from mechanical weakness and, thus, may be prone to cracking (e.g., at the angled corners) and failure, which cause the flanges to lose structural integrity.

The present flange structure and method of making the flange structure integrate additional fiber tows and/or fiber tows having a larger diameter in the flange area during the process of preforming the flange corners. The present flange structure and method can be used for integral flanges constructed out of a variety of preforms such as three-dimensional (3D) weave, a two-dimensional (2D) weave, or a braid. Furthermore, the present flange structure and method can be used in a variety of casing structures such as a fan containment case and front frame outer shell.

FIG. 3A is a schematic representation of a portion of the first casing structure 201 prior to forming the first flange 202, according to an embodiment of the present disclosure. In an embodiment, the first casing structure 201 is constructed from a variety of preforms such as a three-dimensional (3D) weave (also called a Z-weave) structure, a two-dimensional (2D) weave structure, or a braid structure. However, to take into account the formation of the first angled corner 202A (shown in FIG. 2) of the first flange 202, the reinforcing fiber tows (e.g., carbon fibers) within the three-dimensional (3D) weave or the two-dimensional (2D) weave of the preform are selected and configured such that additional or larger reinforcing fiber tows during the 3D weaving process are provided at the first angled corner 202A. For example, as shown in FIG. 3A, the first angled corner 202A (shown in FIG. 2) of the first flange 202 has a bump 214 in a region 212 of the first flange 202. The bump 214 corresponds to a region were the three-dimensional (3D) weave structure is configured for the construction of the first angled corner 202A prior to forming the first angled corner 202A.

FIG. 3B is a schematic cross section of a region 301 of a 3D weave preform 300 used at the first angled corner 202A (shown in FIG. 2) of the first flange 202 of the first casing structure 201, according to an embodiment of the present disclosure. The region 301 of the 3D weave preform 300 used at the first angled corner 202A of the first flange 202 of the first casing structure 201 corresponds to the region 212 showing the bump 214, in FIG. 2. The 3D weave preform 300 is selected to increase stiffness or strength at the first angled corner 202A of the first flange 202 of the first casing structure 201.

As shown in FIG. 3B, the region 301 of the 3D weave preform 300 comprises a first plurality of reinforcing fiber tows 302 (e.g., carbon fibers), a second plurality of reinforcing fiber tows 304 (e.g., carbon fibers), and a third plurality of reinforcing fiber tows 306 (e.g., carbon fibers). For clarity, a fourth plurality of reinforcing fiber tows used to tie together the first plurality of reinforcing fiber tows 302 (e.g., carbon fibers), the second plurality of reinforcing fiber tows 304 (e.g., carbon fibers), and the third plurality of reinforcing fiber tows 306 (e.g., carbon fibers) is not shown in FIG. 3B. The fourth plurality of reinforcing fiber tows may be referred to as interlocking fiber tows or Z-weavers. For example, the first plurality of reinforcing fiber tows 302 correspond to weft fibers, and the second plurality of reinforcing fiber tows 304 and the third plurality of reinforcing fiber tows 306 correspond to warp fibers. In an embodiment, as shown in FIG. 3B, the second plurality of reinforcing fiber tows 304 and the third plurality of reinforcing fiber tows 306 have different diameters. For example, a diameter of a reinforced fiber tow can be varied by varying a number of fibers used in the reinforced fiber tow. As shown in FIG. 3B, the first plurality of reinforcing fiber tows 302 (the weft fibers) run parallel to the plane of the figure, whereas the second plurality of reinforcing fiber tows 304 and the third plurality of reinforcing fiber tows 306 (the warp fibers) run substantially perpendicular to the plane of the figure. Therefore, the second plurality of reinforcing fiber tows 304 (the warp fibers) and the third plurality of reinforcing fiber tows 306 (the warp fibers) are substantially perpendicular to the first plurality of reinforcing fiber tows 302 (the weft fibers). The term "substantially perpendicular" is used herein to mean an angle equal to 90 degrees±10 degrees. The second plurality of reinforcing fiber tows 304 and the third plurality of reinforcing fiber tows 306 are substantially parallel to each other and the second plurality of reinforcing fiber tows 304 have a diameter less than a diameter of the third plurality of reinforcing fiber tows 306.

As shown in FIG. 3B, at least one of the first plurality of reinforcing fiber tows 302 is located in the vicinity of the first outer radius surface 202D of the first flange 202. As shown in FIG. 3C, the second plurality of reinforcing fiber tows 304 and the third plurality of reinforcing fiber tows 306 are located in the vicinity of the first inner radius surface 202C of the first flange 202. As illustrated in FIG. 3B, the third plurality of reinforcing fiber tows 306 form a triangular shape 308 having an apex located near the first inner radius surface 202C. Therefore, in an embodiment, a number of the third plurality of reinforcing fiber tows 306 increases with an increasing distance D from the first inner radius surface 202C. In an embodiment, a diameter of each of the third plurality of reinforcing fiber tows 306 is greater than a diameter of each of the second plurality of reinforcing fiber tows 304 and a diameter of each of the first plurality of reinforcing fiber tows 302. By providing an increased number of the third plurality of reinforcing fiber tows 306 with increasing distance from the first inner radius surface 202C, allows constructing the first angled corner 202A instead of manually laying in additional build-up materials and/or machining plies. In addition, the increasing number of the third plurality of reinforcing fiber tows 306 from the first inner radius surface 202C increases rigidity for the first angled corner 202A.

In an embodiment, instead of, or in addition to, providing the third plurality of reinforcing fiber tows 306 with greater diameter than the diameter of the second plurality of reinforcing fiber tows 304 and the diameter of the first plurality of reinforcing fiber tows 302, the third plurality of reinforcing fiber tows 306 can be provided with a higher rigidity modulus. In another embodiment, instead of, or in addition to, providing the third plurality of reinforcing fiber tows 306 with a greater diameter than the diameter of the second plurality of reinforcing fiber tows 304 and the diameter of the first plurality of reinforcing fiber tows 302, a density (or a number) of the third plurality of reinforcing fiber tows 306 can be increased such that the density of the third plurality of reinforcing fiber tows 306 can be greater than a density of the second plurality of reinforcing fiber tows 304, or a density of the first plurality of reinforcing fiber tows 302 to increase stiffness and rigidity near the first angled corner 202A.

When bending and forming the first angled corner 202A, the triangular shape 308 (or V-shape) having an apex located near the first inner radius surface 202C rotates so that the apex of the triangular shape 308 is located at an angle AN of the first angled corner 202A (shown in FIG. 3C).

In an embodiment, a diameter of each of the second plurality of reinforcing fiber tows 304 located near the first outer radius surface 202D can be less than a diameter of each of the third plurality of reinforcing fiber tows 306. This feature enables forming a lesser curvature radius RA (shown in FIG. 3C) at the first outer radius surface 202D when forming the first angled corner 202A. The second plurality of reinforcing fiber tows 304 having a lesser diameter provides more space or volume for packing or compacting more fibers when bending and forming the first angled corner 202A. In another embodiment, instead of, or in addition to, providing the diameter of the second plurality of reinforcing fiber tows 304 located near the first outer radius surface 202D less than the diameter of the third plurality of reinforcing fiber tows 306, a density (or a number) of the second plurality of reinforcing fiber tows 304 located near the first outer radius surface 202D car be decreased. Decreasing the density of the second plurality of reinforcing fiber tows 304 located near the first outer radius surface 202D can also provide more space or volume for packing or compacting more fibers when bending and forming the first angled corner 202A.

FIG. 3C is a schematic representation of the portion of the first casing structure 201 after forming the first flange 202, according to an embodiment of the present disclosure. In an embodiment, to take into account, the formation of the first angled corner 202A (shown in FIG. 2) of the first flange 202, the reinforcing fiber tows (e.g., carbon fibers) within the three-dimensional (3D) weave or the two-dimensional (2D) weave of the preform are selected and configured such that additional fiber tows and/or fiber tows having a larger diameter during the 3D weaving process are provided at the first angled corner 202A. The first casing structure 201 is bent to form the first angled corner 202A. As described above with respect to FIG. 3B, the first plurality of reinforcing fiber tows 302, the second plurality of reinforcing fiber tows 304, and the third plurality of reinforcing fiber tows 306 are configured so as to provide or to construct the first angled corner 202A by integrally weaving additional fibers and/or fibers having a larger diameter to use to provide additional strength. When forming the first angled corner 202A, the first outer radius surface 202D is bent to define a curved surface having a radius RA, as shown in FIG. 3C.

Integrally weaving additional fiber tows and/or fiber tows having a larger diameter in the flange area to construct the flange corner, also referred to as a heel, instead of manually laying in additional build-up and/or machining plies, provides strength to the flange corner, and the flange as whole. In addition, a top surface of a fiber preform in the flange corner area can be provided with a reduced count of fiber tows and/or fiber tows having a smaller diameter so as to form a smaller and/or a smoother inner radius RA (shown in FIG. 3C). In addition, using a three-dimensional (3D) weaving process, a two-dimensional (2D) weaving process, or a braiding process enables automated integration of additional fibers tows and/or fiber tows having a larger diameter at the outer radius of the flange corner.

The present flange structure and method are applicable to a typical integral ninety-degree upturned flange, or any structural member that is constructed with a straight preform bent to a desired angle (e.g., an angle between thirty degrees and hundred and fifty degrees). The present flange structure and method improve the angled (e.g., square) corner manufacturing process, and provide a more robust flange structure, and better load carrying capability for using a fastener such as a bolted joint.

Although carbon fibers are provided above as an example of the fibers used to form the reinforcing fiber tows, other types of fibers can also be used, including, but not limited to, glass fibers, carbon fibers, steel fibers, or para-aramid fibers, such as Kevlar® available from DuPont of Wilmington, Delaware, or any combination thereof. Furthermore, although a three-dimensional woven carbon fiber composite structure is described in the above paragraphs as being used in the first flange 202, a two-dimensional woven fiber composite structure can also be used.

In an embodiment, after forming the first angled corner 202A of the first flange 202, the 3D weave preform 300 is put in a mold and then injected with a liquid resin or a polymer matrix to fill the voids not occupied by the first plurality of reinforcing fiber tows 302, the second plurality of reinforcing fiber tows 304, and the third plurality of reinforcing fiber tows 306. The liquid resin or the polymer matrix may further include filler materials such as silicon carbides. The 3D weave preform 300 along with the resin inside the mold may then undergo thermal processing to cure the resin or the polymer matrix to obtain a desired solidified shape of the first flange 202. The mold is then removed to form the first flange 202 with the first angled corner 202A.

The third plurality of reinforcing fiber tows 306 are thus integrated within the first plurality of reinforcing fiber tows 302 and the second plurality of reinforcing fiber tows 304. The third plurality of reinforcing fiber tows 306 are provided at a selected location (e.g., in a triangular configuration) within the 3D weave preform 300, as described in the above paragraphs. The third plurality of reinforcing fiber tows 306 are introduced as additional material to the first plurality of reinforcing fiber tows 302 and the second plurality of reinforcing fiber tows 304 to provide reinforcement at the first angled corner 202A. When the first casing structure 201 is bent to form the first angled corner 202A, the vertex of the angle AN of the first angled corner 202A (shown in FIG. 3C) is slightly curved or rounded (a curved vertex) due to the inherent curvature of the reinforcing fiber tows. However, after adding the resin to the reinforcing fiber tows within the mold, curing the resin, and, then, removing the mold, the vertex of the angle AN becomes straight (e.g., less curved vertex). The use of the mold and the resin allows forming a less curved vertex of the first angled corner 202A at the angle AN.

In another embodiment, a mold may not be used, in which case, after providing the resin and curing the resin within the 3D weave preform 300, the vertex may still be curved. However, some material at the angle AN can be removed mechanically by removing sacrificial layers of material, which may include hardened resin and a portion of the first plurality of reinforcing fiber tows 302, a portion of the second plurality of reinforcing fiber tows 304, and/or a portion of the third plurality of reinforcing fiber tows 306. By removing sacrificial layers of material, a straight vertex at the first angled corner 202A of the first flange 202 can be obtained. However, some of the third plurality of reinforcing fiber tows 306 is still present within the 3D weave preform 300. As a result, the first angled corner 202A of the first flange 202 may still have the desired strength qualities.

In the above paragraphs, a detailed description is provided with respect to the first casing structure 201 and the first flange 202. A similar description can be applied to the second casing structure 203 and the second flange 204

(shown in FIG. 2). As shown in FIG. 2, the second casing structure 203 and second flange 204 are similar in many aspects to the first casing structure 201 and the first flange 202.

Figure 4A:
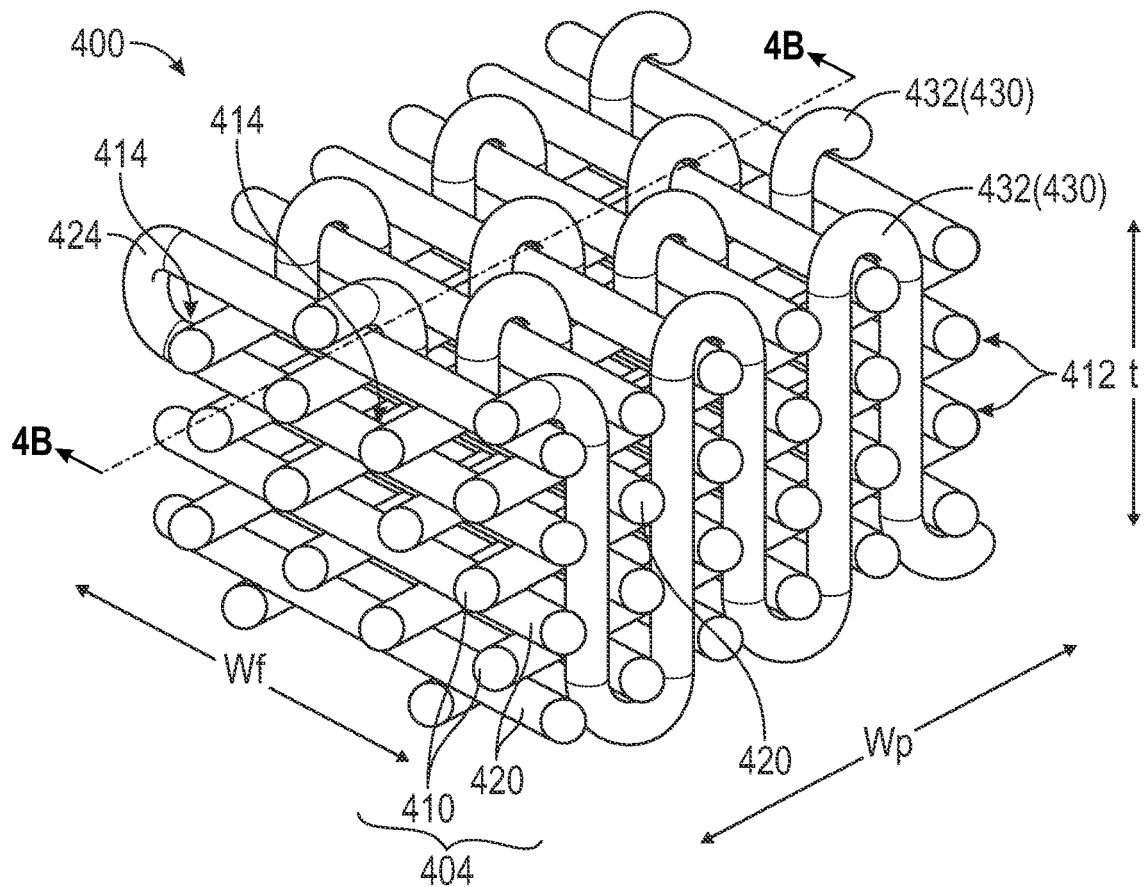
FIG. 4A is a schematic view of a three-dimensional fiber weave pattern, according to an embodiment of the present disclosure.
Figure 4B:
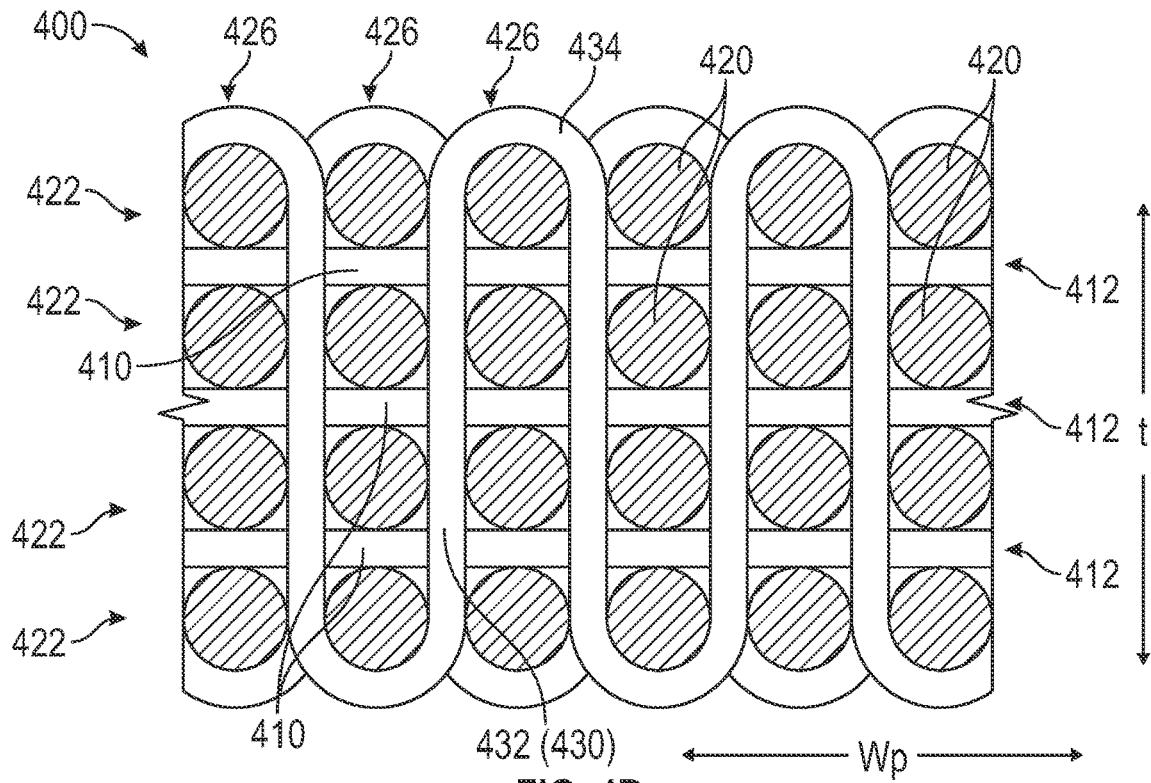
FIG. 4B is a schematic, cross-sectional view of the fiber weave pattern shown in FIG. 4A taken along line 4B-4B in FIG. 4A. according to an embodiment of the present disclosure.

FIGS. 4A and 4B are schematics showing a three-dimensional fiber weave pattern that may be used to form woven fabric 400. FIG. 4B is a cross-sectional view taken along line 4B-4B in FIG. 4A. In embodiments discussed herein, the composite components may be formed from a plurality of reinforcing fibers and, more specifically, a plurality of reinforcing fiber tows 404. As noted above, the plurality of reinforcing fiber tows 404 may be woven together to form a 3D weave structure, such as the woven fabric 400 shown in FIG. 4A, and the woven fabric 400 may thus be woven to form the first casing structure 201, shown in FIGS. 3A and 3C. The plurality of reinforcing fiber tows 404 of the woven fabric 400 include a plurality of first fiber tows, which in this embodiment is a plurality of warp fiber tows 410. The warp fiber tows 410 of the woven fabric 400, when forming the first casing structure 201, include the second plurality of reinforcing fiber tows 304 and the third plurality of reinforcing fiber tows 306 discussed above. The plurality of reinforcing fiber tows 404 also include a plurality of second fiber tows, which in this embodiment is a plurality of weft fiber tows 420. The weft fiber tows 420 of the woven fabric 400, when forming the first casing structure 201, include the first plurality of reinforcing fiber tows 302 discussed above. The weft fiber tows 420 are oriented transversely to the warp fiber tows 410, and in the depicted embodiment, the warp fiber tows 410 and the weft fiber tows 420 are oriented generally orthogonally to each other. The woven fabric 400 thus includes a warp direction Wp (also referred to as a first direction) and a weft direction Wf (also referred to as a second direction). The warp fiber tows 410 extend in the warp direction Wp and the weft fiber tows 420 extend in the weft direction Wf.

In the depicted embodiment, the woven fabric 400 is a three-dimensional woven fabric and the woven fabric 400 also includes a thickness direction t. The thickness direction may also be referred to as a z direction. The warp fiber tows 410 are arrayed in both the weft direction Wf and the thickness direction t. The warp fiber tows 410 may be parallel to each other in both the weft direction Wf and the thickness direction t, and the woven fabric 400 may include a plurality of warp fiber layers 412 in the thickness direction t and a plurality of warp fiber columns 414 in the weft direction Wf. Three warp fiber layers 412 are depicted in FIGS. 4A and 4B, but the woven fabric 400 may include any other numbers of warp fiber layers 412, including more than three warp fiber layers 412.

During a weaving process, the warp fiber tows 410 may be held in tension in the warp direction Wp, and one of the weft fiber tows 420 is passed or drawn therethrough. A shuttle (not shown) may be used to draw the one of the weft fiber tows 420 through the warp fiber tows 410. The shuttle may be passed through the warp fiber tows 410 in a first direction and then reversed to pass through the warp fiber tows 410 at a different height in the thickness direction forming a plurality of weft fiber layers 422 in the thickness direction t. One of the weft fiber tows 420 may be continuous through at least a portion of the thickness of the woven fabric 400, and the one of the weft fiber tows 420 may include a portion extending in the thickness direction t, which may be referred to in some embodiments as a turnaround. This portion of the weft fiber tow thus may be referred to herein as a turnaround portion 424. The warp fiber tows 410 may be moved relative to each other to allow a space for the one of the weft fiber tows 420 to pass through the space. The warp fiber tows 410 may be moved relative to each other in different ways to create different patterns. In this way, weaving the woven fabric 400 includes positioning the warp fiber tows 410 (e.g., such that the warp fiber tows 410 are held stationary in tension), then laying the weft fiber tows 420 (e.g., such that the weft fiber tows 420 are drawn through and inserted over and under the corresponding warp fibers 410), and repeating this process until the woven fabric 400 is formed. The weft fiber tows 420 may be parallel to each other in both the warp direction Wp and the thickness direction t, and the woven fabric 400 may include the plurality of weft fiber layers 422 in the thickness direction t and a plurality of weft fiber columns 426 in the warp direction Wp.

The woven fabric 400 also includes a plurality of interlocking fiber tows 430 (also referred to as Z-weaver fiber tows). As noted above, the interlocking fiber tows 430 of the woven fabric 400, when forming the first casing structure 201 (shown in FIGS. 3A and 3C), include the fourth plurality of reinforcing fiber tows. The interlocking fiber tows 430 are additional warp fiber tows that are directed through the thickness of the woven fabric 400 during weaving to stitch the plurality of reinforcing fiber tows 404 together. The interlocking fiber tows 430 are woven to extend between two or more of the weft fiber layers 422. Different fiber patterns may be used for the interlocking fiber tows 430. A first interlocking fiber pattern, shown in FIGS. 4A and 4B, is an orthogonal interlocking pattern and the interlocking fiber tows 430 are referred to herein as orthogonal interlocking fiber tows 432. In this pattern, the orthogonal interlocking fiber tows 432 extend substantially in a direction that is orthogonal to the warp direction Wp, which is the thickness direction t in the depicted embodiment. As with the weft fiber tows 420, the interlocking fiber tows 430 (e.g., the orthogonal interlocking fiber tows 432) may include a turnaround portion 434. In the depicted embodiment, the turnaround portion 434 of the orthogonal interlocking fiber tows 432 is positioned to form an alternating pattern between each warp fiber column 414. In the depicted embodiment, the orthogonal interlocking fiber tows 432 extend through the thickness of the woven fabric 400 and may be referred to as through-thickness interlocking fiber tows, but other thicknesses may be used.

Figure 4C:
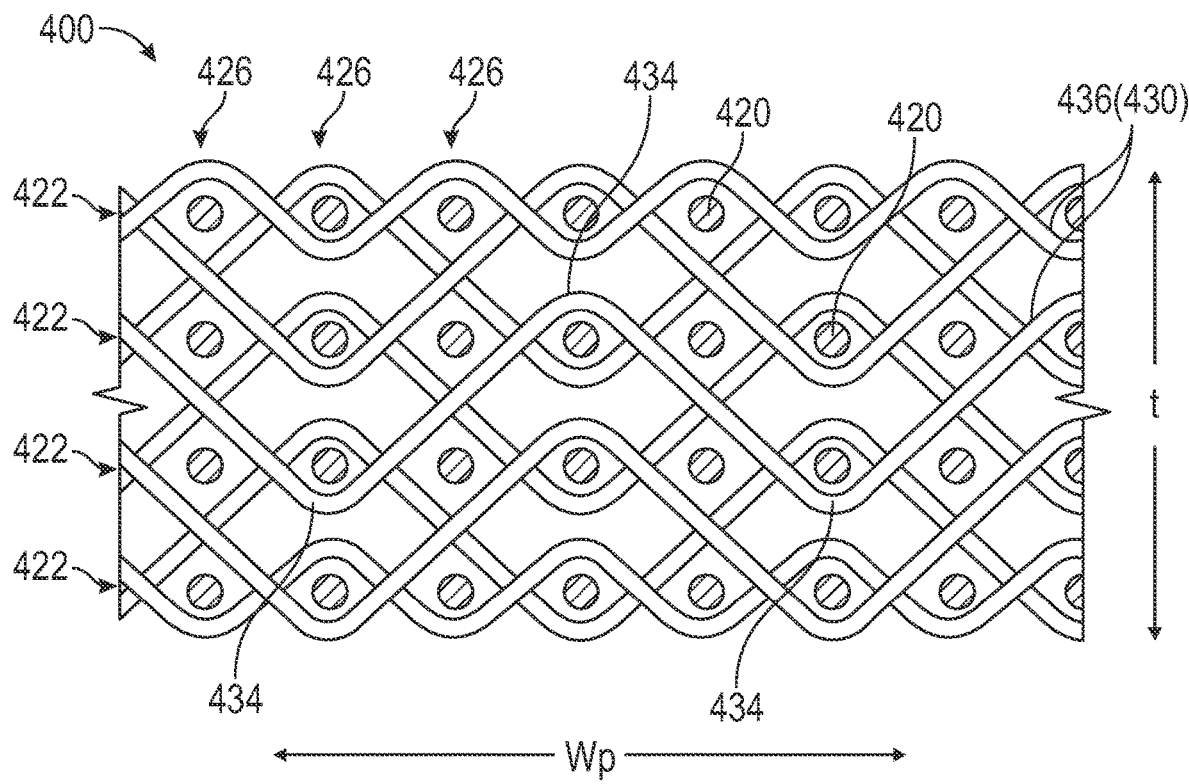
FIG. 4C is a schematic, cross-sectional view of a fiber weave pattern shown similar to fiber weave pattern shown in FIG. 4A, but with a different interlocking fiber pattern, according to another embodiment of the present disclosure.
Figure 4D:
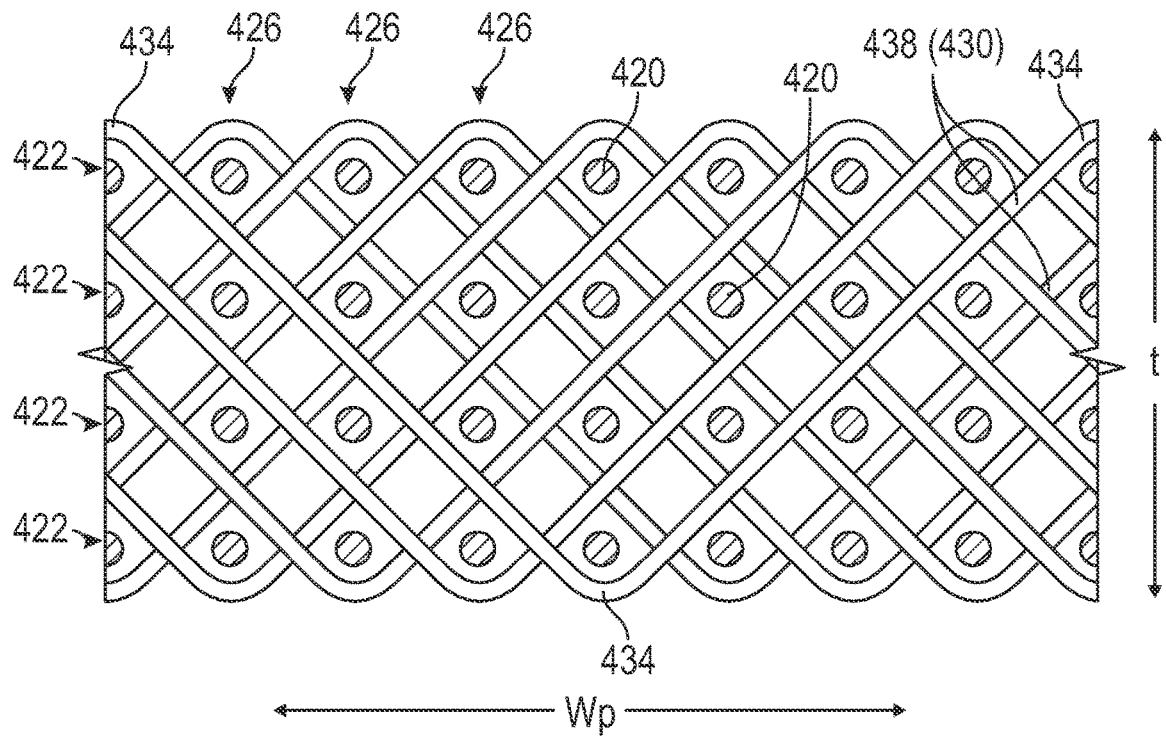
FIG. 4D is a schematic, cross-sectional view of a fiber weave pattern shown similar to fiber weave pattern shown in FIG. 4A, but with another interlocking fiber pattern, according to another embodiment of the present disclosure.

A second interlocking fiber pattern, shown in FIG. 4C, is an angle interlock pattern and, more specifically, a layer-to-layer angle interlock pattern. FIG. 4C is a cross-sectional view of a woven fabric taken from a perspective similar to FIG. 4B. The interlocking fiber tows 430 are referred to in this embodiment as angled interlocking fiber tows 436. Instead of extending orthogonally through the woven fabric 400, the angled interlocking fiber tows 436 form an oblique angle relative to the warp direction Wp. In the depicted embodiment, the angled interlocking fiber tows 436 extend between adjacent weft fiber layers 422 in an alternating or a sinusoidal pattern, with the oblique angle formed between adjacent turnaround portions 434 of the angled interlocking fiber tows 436. The turnaround portions 434 of the angled interlocking fiber tows 436 are located on every other weft fiber columns 426, but, in other embodiments, two or more weft fiber columns 426 may be between adjacent turnaround portions 434 of the angled interlocking fiber tows 436. In other embodiments, the angled interlocking fiber tows 436 may extend between more than two adjacent weft fiber layers 422. For example, as shown in FIG. 4D, the interlocking fiber tows 430 are through-thickness interlocking fiber tows, which are referred to herein as through-thickness angled interlocking fiber tows 438. FIG. 4D is a cross-sectional view of a woven fabric taken from a perspective similar to FIG. 4B. The warp fiber tows 410 are omitted in FIGS. 4C and 4D for clarity.

When weaving the woven fabric 400, shown in FIG. 4A, for example, some of the warp fiber tows 410 can be replaced by larger diameter or denser warp fiber tows 410 (i.e., the second plurality of reinforcing fiber tows 304 and the third plurality of reinforcing fiber tows 306) so as to form the triangular shape 308 (V-shape).

Figure 5:
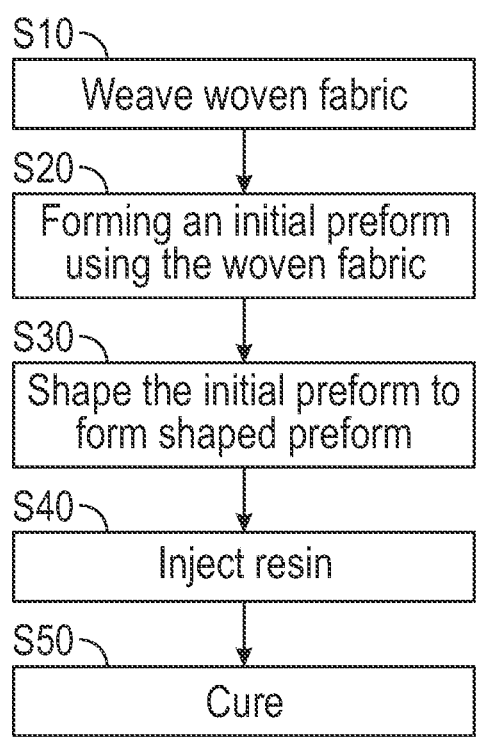
FIG. 5 is a flow chart of a general process for manufacturing a composite component that may be used in making the casing structures shown in FIG. 2, according to an embodiment of the present disclosure.

FIG. 5 is a flow chart of a general process of manufacturing a composite component that may be used in making the casing structures shown in FIG. 2, according to an embodiment of the present disclosure. The method includes, in step S10, weaving the woven fabric 400 (3D woven fabric), such as on a loom. In step S20, the method includes forming an initial preform using one or more pieces of woven fabric 400. This step may include, for example, laying up a plurality of woven fabrics 400 or otherwise positioning the plurality of woven fabrics 400 relative to each other to form the initial preform.

In the case of 2D woven fabric layups, the 2D woven fabric is woven together in step S10 and then a plurality of the 2D woven fabrics are laid up and joined together to form a stack of 2D woven fabric layups in step S20. When using the 2D woven fabric layups, at step S20, the method includes forming an initial preform using the stack of 2D woven fabric layups. Similar to the 3D woven fabric 400, the 2D woven fabric layups can also have some of a plurality of reinforcing fibers in the 2D woven fabric layups be replaced by larger diameter or denser reinforcing fibers so as to form the triangular shape (V-shape).

The making of the preform, however, is not limited to only woven fabrics but can also be used with reinforcing fiber tows that are laid up to form a plurality of plies using other processes to form the initial preform in step S20. In such a case, step S10 may be omitted, and a plurality of reinforcing fiber tows are laid up to form the first plurality of reinforcing fiber tows 302 (FIG. 3B), the second plurality of reinforcing fiber tows 304 (FIG. 3B), and the third plurality of reinforcing fiber tows 306 (FIG. 3B) in the arrangements discussed above. The plurality of plies may be laid up by hand (i.e., hand lay-up) or using an automated process including an automated lay-up system. The automated lay-up system and corresponding automated process may be, for example, an Automated Tape Laying (ATL) system, an Automated Fiber Placement (AFP) system, a Thermoplastic Fiber/Tape Placement (TTP) system, Pick-and-Place system, and the like.

In step S30, the initial preform is shaped to form a shaped preform. Shaping the initial preform may include, for example, using a mold tool to shape the initial preform. Suitable shaping processes may include vacuum forming or other forming processes to impart a shape to the initial preform. The shaped preform may form a final preform, but optionally, additional machining processes and manufacturing processes, such as adding inserts, may be carried out on the shaped preform to form the final preform.

After the preform is complete (i.e., the final preform), a matrix material may be injected into the preform in step S40 to generate an infiltrated (or an impregnated) preform. When the composite component is a polymer matrix composite, polymers and/or a resin may be pumped into, injected into, or otherwise provided to a mold or a cavity to infiltrate or to impregnate the dry fibers in this step. This step may be done in conjunction with step S30 when using resin transfer molding (RTM) processes, for example. Other infiltration processes may be used in this step depending upon the matrix material. As noted above, the preform may be formed using prepreg fiber tows, and, in such an embodiment, this step (step S40) may be omitted.

The method continues with curing the infiltrated preform in step S50 to bond the composite material and, more specifically, the matrix together forming the composite component. The curing process depends upon the material and may include solidifying or otherwise hardening the matrix material around the fiber tows within the preform. For example, when the matrix material is a polymer, the curing may include both solidifying and chemically crosslinking the polymer chains. Curing the infiltrated preform can include several processes. For instance, an infiltrated preform may be debulked and cured by exposing the infiltrated preform to elevated temperatures and pressures in an autoclave. The infiltrated preform may also be subjected to one or more further processes, such as, e.g., a burn off cycle and a densification process. The curing step S50 may be done in conjunction with step S40, such as when the matrix material is injected into the final preform in a molten state and the curing step includes cooling the matrix material.

The present flange structure and method of making the flange structure integrate additional and/or reinforcing fiber tows (the third plurality of reinforcing fiber tows 306) with a larger diameter than a diameter of other reinforcing fiber tows within the 3D or 2D weave structure in the flange area during the process of preforming the flange corners. The present flange structure and method can be used for integral flanges constructed out of a variety of preforms such as three-dimensional (3D) weave, a two-dimensional (2D) weave or a braid, as described in the above paragraphs. Furthermore, the present flange structure and method can be used in a variety of casing structures such as a fan containment case, a front frame outer shell, or both.

Integrally weaving additional and/or larger fiber tows in the flange area to construct the flange corner, also referred to as a heel, instead of manually laying in additional build-up and/or machining plies, provides strength to the flange corner, and the flange as whole. In addition, the outer radius surface of the fiber preform in the flange corner area can be provided with a reduced count of fiber tows and/or fiber tows having a smaller diameter so as to form a lesser and/or a smoother inner radius. In addition, using a three-dimensional (3D) weaving process or a two-dimensional (2D) weaving or braiding process enables automated integration of additional fiber tows and/or fiber tows having a larger diameter at the outer radius of the flange corner.

The present flange structure and method is applicable to a typical integral ninety-degree upturned flange, or any structural member that is constructed with a straight preform bent to a desired angle (e.g., an angle from thirty degrees to one hundred fifty degrees). The present flange structure and method improves the square corner manufacturing process. The square corner manufacturing process also provides a more robust flange structure and better load carrying capability for using a fastener (e.g., a bolted joint).

Further aspects are provided by the subject matter of the following clauses.

A preform for making a casing structure, the preform including a plurality of reinforcing fiber tows arranged in a two-dimensional weave structure, a three-dimensional weave structure, or a braided structure, wherein the plurality of reinforcing fiber tows comprise integrally woven or braided fiber tows having a diameter or a density greater than a respective diameter or density of other woven or braided fiber tows, and wherein the integrally woven or braided fiber tows are located in an area of the preform that is bent to form an angled corner to thereby provide strength to a casing structure comprising the angled corner.

The preform of the preceding clause, wherein the angled corner of the preform is from thirty degrees to one hundred fifty degrees.

The preform of any preceding clause, wherein each of the plurality of reinforcing fiber tows includes a plurality of carbon fibers, a plurality of glass fibers, a plurality of steel fibers, a plurality of para-aramid fibers, or any combination thereof.

The preform of any preceding clause, wherein the plurality of reinforcing fiber tows include a first plurality of reinforcing fiber tows, a second plurality of reinforcing fiber tows, and a third plurality of reinforcing fiber tows, and the third plurality of reinforcing fiber tows include the integrally woven or braided fiber tows.

The preform of any preceding clause, wherein a diameter of the third plurality of reinforcing fiber tows is greater than a diameter of the first plurality of reinforcing fiber tows and a diameter of the second plurality of reinforcing fiber tows.

The preform of any preceding clause, wherein a density of the third plurality of reinforcing fiber tows is greater than a density of the first plurality of reinforcing fiber tows and a density of the second plurality of reinforcing fiber tows.

The preform of any preceding clause, wherein the two-dimensional or the three-dimensional weave structure defines an outer radius surface and an inner radius surface of the preform, and the integrally woven reinforcing fiber tows are located near the inner radius surface.

The preform of any preceding clause, wherein a number of the third plurality of reinforcing fiber tows increases with an increasing distance from the inner radius surface so as to form a triangular shape having an apex located near the inner radius surface.

The preform of any preceding clause, wherein a diameter of the second plurality of reinforcing fiber tows located near the outer radius surface of the preform is less than a diameter of the third plurality of reinforcing fiber tows located near the inner radius surface of the preform so as to form a lesser curvature radius when forming the angled corner of the preform.

A casing structure having an integral flange including the preform according to any preceding clause, the angled corner forming a portion of the integral flange, and a polymer matrix material, wherein the plurality of reinforcing fiber tows of the preform are embedded within the polymer matrix material.

A three-dimensional weave structure including a first plurality of reinforcing fiber tows, a second plurality of reinforcing fiber tows, and a third plurality of reinforcing fiber tows. A diameter of each of the third plurality of reinforcing fiber tows is greater than a diameter of each of the first plurality of reinforcing fiber tows and a diameter of each of the second plurality of reinforcing fiber tows, or a density of the third plurality of reinforcing fiber tows is greater than a density of the first plurality of reinforcing fiber tows, a density of the second plurality of reinforcing fiber tows, or both. A number of the third plurality of reinforcing fiber tows increases with an increasing distance from an inner radius surface of the three-dimensional weave structure so as to form a triangular shape having an apex located near the inner radius surface.

The three-dimensional weave structure of the preceding clause, wherein each of the first plurality of reinforcing fiber tows, the second plurality of reinforcing fiber tows and the third plurality of reinforcing fiber tows includes a plurality of carbon fibers, a plurality of glass fibers, a plurality of steel fibers, a plurality of para-aramid fibers, or any combination thereof.

The three-dimensional weave structure of any preceding clause, wherein the first plurality of reinforcing fiber tows corresponds to weft fibers, and the second plurality of reinforcing fiber tows and the third plurality of reinforcing fiber tows correspond to warp fibers.

The three-dimensional weave structure of any preceding clause, wherein the third plurality of reinforcing fiber tows are located near the inner radius surface.

The three-dimensional weave structure of any preceding clause, wherein the second plurality of reinforcing fiber tows and the third plurality of reinforcing fiber tows are substantially perpendicular to the first plurality of reinforcing fiber tows.

The three-dimensional weave structure of any preceding clause, wherein the second plurality of reinforcing fiber tows and the third plurality of reinforcing fiber tows are substantially parallel to each other.

The three-dimensional weave structure of any preceding clause, wherein a number of the third plurality of reinforcing fiber tows increases with an increasing distance from the inner radius surface so as to form a triangular shape having an apex located near the inner radius surface.

The three-dimensional weave structure of any preceding clause, wherein the third plurality of reinforcing fiber tows are distributed at a selected location within three-dimensional weave structure so as to define a triangular shape.

A turbine engine includes a casing structure having an integral flange, the casing structure including a preform and a polymer matrix material. The preform includes a plurality of reinforcing fiber tows arranged in a two-dimensional weave structure, a three-dimensional weave structure, or a braided structure, wherein the plurality of reinforcing fiber tows include integrally woven or braided fiber tows having a diameter or a density greater than a respective diameter or density of other woven or braided fiber tows, and wherein the integrally woven or braided fiber tows are located in an area of the preform that is bent to form an angled corner to thereby provide strength to the casing structure comprising the angled corner, the angled corner forming a portion of the integral flange, and wherein the plurality of reinforcing fiber tows of the preform are embedded within the polymer matrix material.

The turbine engine of the preceding clause, wherein the angled corner of the preform is from thirty degrees to one hundred fifty degrees.

The turbine engine of any preceding clause, wherein each of the plurality of reinforcing fiber tows includes a plurality of carbon fibers, a plurality of glass fibers, a plurality of steel fibers, a plurality of para-aramid fibers, or any combination thereof.

The turbine engine of any preceding clause, wherein the polymer matrix material includes a thermoset resin, a thermoplastic resin, bismaleimide (BMI) materials, or polyimide materials, or any combination thereof.

The turbine engine of any preceding clause, wherein the plurality of reinforcing fiber tows include a first plurality of reinforcing fiber tows, a second plurality of reinforcing fiber tows, and a third plurality of reinforcing fiber tows, and the third plurality of reinforcing fiber tows include the integrally woven or braided fiber tows.

The turbine engine of any preceding clause, wherein a diameter of each of the third plurality of reinforcing fiber tows is greater than a diameter of each of the first plurality of reinforcing fiber tows and a diameter of the second plurality of reinforcing fiber tows.

The turbine engine of any preceding clause, wherein a density of the third plurality of reinforcing fiber tows is greater than a density of the first plurality of reinforcing fiber tows and a density of the second plurality of reinforcing fiber tows.

The turbine engine of any preceding clause, wherein the two-dimensional weave structure, the three-dimensional weave structure, or the braided structure defines an outer radius surface and an inner radius surface of the preform, and the integrally woven reinforcing fiber tows are located near the inner radius surface.

The turbine engine of any preceding clause, wherein a number of the third plurality of reinforcing fiber tows increases with an increasing distance from the inner radius surface so as to form a triangular shape having an apex located near the inner radius surface.

The turbine engine of any preceding clause, wherein a diameter of the second plurality of reinforcing fiber tows located near the outer radius surface of the preform is less than a diameter of the third plurality of reinforcing fiber tows located near the inner radius surface of the preform so as to form a lesser curvature radius when forming the angled corner of the preform.

The turbine engine of any preceding clause, wherein the polymer matrix material comprises a thermoset resin, a thermoplastic resin, bismaleimide (BMI) materials, or polyimide materials, or any combination thereof.

The turbine engine of any preceding clause, wherein the casing structure can be a part of a casing of a fan of the turbine engine, a part of a casing of low pressure turbine of the turbine engine, or a part of a casing of the low pressure compressor of the turbine engine.

A method of making a casing structure including a plurality of reinforcing fiber tows arranged in a two-dimensional or a three-dimensional weave structure. The method includes integrally weaving or braiding reinforcing fiber tows having a diameter or a density greater than a respective diameter or a density of other reinforcing fiber tows in the two-dimensional or the three-dimensional weave structure, locating the integrally woven reinforcing fiber tows in the two-dimensional weave structure, the three-dimensional weave structure, or the braided structure to provide strength to an angled corner of the casing structure, adding a polymer matrix to the two-dimensional weave structure, the three-dimensional weave structure, or the braided structure so that the plurality of reinforcing fiber tows are embedded in the polymer matrix, and curing the polymer matrix to obtain the casing structure.

The method of the preceding clause, wherein adding the polymer matrix to the two-dimensional or a three-dimensional weave structure so that the plurality of reinforcing fiber tows are embedded in the polymer matrix includes injecting the polymer matrix into a mold containing the two-dimensional or the three-dimensional weave structure to fill voids not occupied by the plurality of reinforcing fiber tows, curing the polymer matrix containing the plurality of reinforcing fiber tows, and removing the mold to form the casing structure having the angled corner.

A method of any preceding clause, further including shaping the initial preform to form a shaped preform having the angled corner, the shaped preform having the integrally woven reinforcing fiber tows in the two-dimensional or the three-dimensional weave structure arranged to provide strength to the angled corner.

The method of any preceding clause, further including integrally weaving reinforcing fiber tows having the diameter or the density greater than the respective diameter or the density of other reinforcing fiber tows in the two-dimensional or the three-dimensional weave structure, forming a bump at a region of the initial preform where the angled corner is to be formed, bending the initial preform at the bump so as to form the shaped preform having the angled corner.

Although the foregoing description is directed to the preferred embodiments of the present disclosure, other variations and modifications will be apparent to those skilled in the art and may be made without departing from the disclosure. Moreover, features described in connection with one embodiment of the present disclosure may be used in conjunction with other embodiments, even if not explicitly stated above.

The invention claimed is:

1. A preform for making a casing structure, the preform comprising:
   a plurality of reinforcing fiber tows arranged in a two-dimensional weave structure, a three-dimensional weave structure, or a braided structure,
   wherein the plurality of reinforcing fiber tows comprise integrally woven or braided fiber tows having a diameter or a density greater than a respective diameter or density of other woven or braided fiber tows in the two-dimensional weave structure, the three-dimensional weave structure, or the braided structure so as to provide strength and rigidity to the two-dimensional weave structure, the three-dimensional weave structure, or the braided structure in an area of the preform that is bent to form an angled corner of a casing structure, and
   wherein the integrally woven or braided fiber tows are located in the area of the preform that is bent to form the angled corner of the casing structure to thereby provide strength and rigidity to the angled corner of the casing structure.

2. The preform of claim 1, wherein the angled corner is from thirty degrees to one hundred fifty degrees.

3. The preform of claim 1, wherein each of the plurality of reinforcing fiber tows comprises a plurality of carbon fibers, a plurality of glass fibers, a plurality of steel fibers, a plurality of para-aramid fibers, or any combination thereof.

4. The preform of claim 1, wherein the plurality of reinforcing fiber tows comprise a first plurality of reinforcing fiber tows, a second plurality of reinforcing fiber tows, and a third plurality of reinforcing fiber tows, and the third plurality of reinforcing fiber tows comprise the integrally woven or braided fiber tows.

5. The preform of claim 4, wherein a diameter of each of the third plurality of reinforcing fiber tows is greater than a diameter of each of the first plurality of reinforcing fiber tows and a diameter of each of the second plurality of reinforcing fiber tows.

6. The preform of claim 4, wherein a density of the third plurality of reinforcing fiber tows is greater than a density of the first plurality of reinforcing fiber tows and a density of the second plurality of reinforcing fiber tows.

7. The preform of claim 4, wherein the two-dimensional weave structure, the three-dimensional weave structure, or the braided structure defines an outer radius surface and an inner radius surface of the preform, and the integrally woven or braided fiber tows are located near the inner radius surface.

8. The preform of claim 7, wherein a number of the third plurality of reinforcing fiber tows increases with an increasing distance from the inner radius surface so as to form a triangular shape having an apex located near the inner radius surface.

9. The preform of claim 7, wherein a diameter of the second plurality of reinforcing fiber tows located near the outer radius surface of the preform is less than a diameter of the third plurality of reinforcing fiber tows located near the inner radius surface of the preform so as to form a lesser curvature radius when forming the angled corner of the preform.

10. A casing structure having an integral flange comprising:
the preform of claim 1, the angled corner forming a portion of the integral flange; and
a polymer matrix material,
wherein the plurality of reinforcing fiber tows of the preform are embedded within the polymer matrix material.

11. A turbine engine comprising:
a casing structure having an integral flange, the casing structure including a preform and a polymer matrix material, the preform comprising:
a plurality of reinforcing fiber tows arranged in a two-dimensional weave structure, a three-dimensional weave structure, or a braided structure,
wherein the plurality of reinforcing fiber tows comprise integrally woven or braided fiber tows having a diameter or a density greater than a respective diameter or density of other woven or braided fiber tows in the two-dimensional weave structure, the three-dimensional weave structure, or the braided structure so as to provide strength and rigidity to the two-dimensional weave structure, the three-dimensional weave structure, or the braided structure in an area of the preform that is bent to form an angled corner of the casing structure, and
wherein the integrally woven or braided fiber tows are located in the area of the preform that is bent to form the angled corner of the casing structure to thereby provide strength and rigidity to the angled corner of the casing structure, the angled corner forming a portion of the integral flange, and
wherein the plurality of reinforcing fiber tows of the preform are embedded within the polymer matrix material.

12. The turbine engine of claim 11, wherein the angled corner of the preform is from thirty degrees to one hundred fifty degrees.

13. The turbine engine of claim 11, wherein each of the plurality of reinforcing fiber tows comprises a plurality of carbon fibers, a plurality of glass fibers, a plurality of steel fibers, a plurality of para-aramid fibers, or any combination thereof.

14. The turbine engine of claim 11, wherein the polymer matrix material comprises a thermoset resin, a thermoplastic resin, bismaleimide (BMI) materials, or polyimide materials, or any combination thereof.

15. The turbine engine of claim 11, wherein the plurality of reinforcing fiber tows comprise a first plurality of reinforcing fiber tows, a second plurality of reinforcing fiber tows, and a third plurality of reinforcing fiber tows, and the third plurality of reinforcing fiber tows comprise the integrally woven or braided fiber tows.

16. The turbine engine of claim 15, wherein a diameter of each of the third plurality of reinforcing fiber tows is greater than a diameter of each of the first plurality of reinforcing fiber tows and a diameter of the second plurality of reinforcing fiber tows.

17. The turbine engine of claim 15, wherein a density of the third plurality of reinforcing fiber tows is greater than a density of the first plurality of reinforcing fiber tows and a density of the second plurality of reinforcing fiber tows.

18. The turbine engine of claim 15, wherein the two-dimensional weave structure, the three-dimensional weave structure, or the braided structure defines an outer radius surface and an inner radius surface of the preform, and the integrally woven or braided fiber tows are located near the inner radius surface.

19. The turbine engine of claim 18, wherein a number of the third plurality of reinforcing fiber tows increases with an increasing distance from the inner radius surface so as to form a triangular shape having an apex located near the inner radius surface.

20. The turbine engine of claim 18, wherein a diameter of the second plurality of reinforcing fiber tows located near the outer radius surface of the preform is less than a diameter of the third plurality of reinforcing fiber tows located near the inner radius surface of the preform so as to form a lesser curvature radius when forming the angled corner of the preform.

* * * * *